Nov. 25, 1930.  C. NEWMAN ET AL  1,782,546
BOX SUPPORTING EAR
Filed Sept. 12, 1927
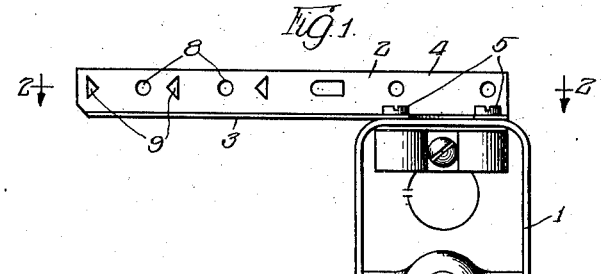
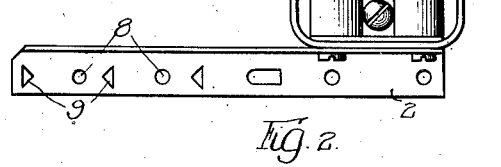
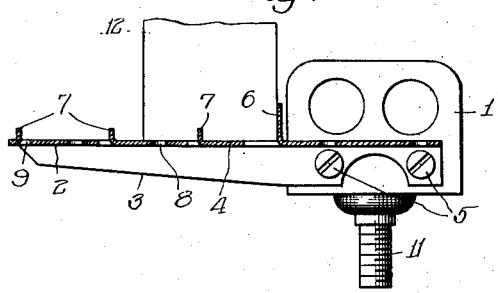
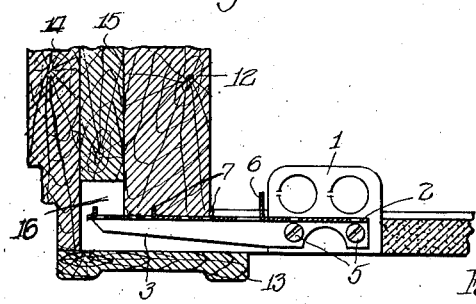
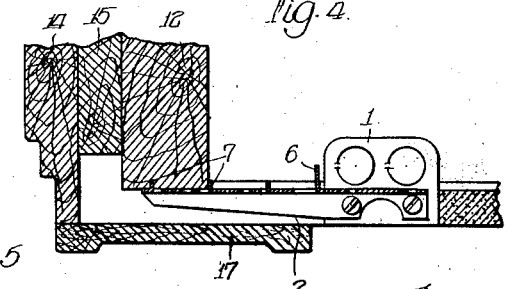
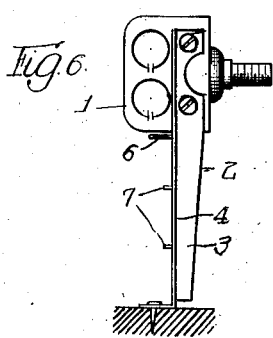
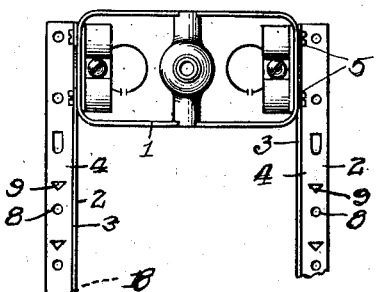
Inventors
Charles Newman,
Ernst G. Appleton, Patented Nov. 25, 1930

1,782,546

UNITED STATES PATENT OFFICE

CHARLES NEWMAN, OF NEW YORK, N. Y., AND ERNST G. APPLETON, OF CHICAGO, ILLINOIS, ASSIGNORS TO ROACH-APPLETON MANUFACTURING COMPANY, OF CHICAGO, ILLINOIS, A CORPORATION OF ILLINOIS

BOX-SUPPORTING EAR

Application filed September 12, 1927. Serial No. 218,932.

The present invention relates to box supporting ears.

The present invention relates to subject matter similar in some respects to that described in the patent to Newman and Appleton No. 1,597,243, granted August 24, 1926.

It is common practice in electric house wiring systems to provide a receptacle for receiving the ends of the wire enclosing conduits. The ends of the wires in said conduits are spliced to leads extending to electric fixtures or electric switches. Such switch boxes are mounted in a great variety of positions relative to the joists or studding of a building, and an object of the present invention is to provide a box supporting ear which is well adapted for use with the ordinary type of switch box in practically all positions in which said switch boxes may be used.

A further object is to provide a box supporting ear which will simplify the matter of cooperation between the electrician who sets up the switch boxes and the artisan who mounts the trim around the doorways and the like in a building.

A further object is to provide a box supporting ear which is well adapted to meet the needs of commercial service and which is adaptable for use with a switch box in a great variety of positions of said switch box relative to the studding or other timbers of a building.

Further objects will appear as the description proceeds.

Referring to the drawings—

Figure 1 is a view in front elevation of a switch box having a pair of box supporting ears mounted thereon;

Figure 2 is a sectional view taken along the plane indicated by the arrows 2—2 of Figure 1, Figure 2 showing the switch box and supporting ears mounted in cooperative relationship with a wall stud;

Figures 3 and 4 are views similar to Figure 2 but showing the switch box and supporting ears disposed in cooperative relationship with a wall stud in connection with doorways having different sizes of trim;

Figure 5 is a view in front elevation of a switch box and a pair of supporting ears showing a modification of said ears;

Figure 6 is a view in end elevation of the structure shown in Figure 5; and

Figure 7 is a sectional view taken along the plane indicated by the arrows 7—7 of Figure 5.

The numeral 1 indicates a switch box, and the numerals 2—2 indicate box supporting ears by means of which said switch box 1 may be supported from a wall stud. The illustrated embodiments of the box supporting ears 2—2 are angular in cross section, one flange, indicated by the numeral 3, having the double function of providing box attaching means and strengthening means and the other flange, indicated by the numeral 4, being provided with a plurality of means for locating said ear relative to and securing same to a wall stud or the like.

The flange 3 in its region adjacent to the switch box 1 is provided with a pair of holes for the reception of screws 5—5 for attaching the corresponding box supporting ear to the switch box 1. As shown in Figure 2, said flange 3 may taper toward the outer extremity of the ear 2.

The flange 4 of the ear 2 is provided with an outwardly struck portion 6 disposed adjacent to the switch box 1. Disposed at spaced regions between the struck out portion 6 and the outer extremity of the ear 2 are other outstruck portions 7—7, three of said portions 7 being illustrated. Said outstruck portions 7—7 and the portion 6 all extend from the corresponding flange 4 in a direction opposite to the flange 3. The flange 4 is also provided with a plurality of holes 8—8 for the reception of nails or screws. The outstruck portions 7 provide openings 9—9 which are also available as nail or screw holes. The outstruck portions 7—7 are pointed, whereby to provide attaching prongs for temporarily securing the corresponding ear to a wall stud prior to the insertion of nails or screws.

The particular switch box chosen for illustration is provided with a bridging member 10 having the screw-threaded stud 11, which bridging member 10 and stud 11 are adapted to support an electric fixture. Figure 2 shows a construction in which the switch box is disposed closely adjacent to a wall stud 12. In the event that the switch box is not to be used adjacent to a doorway or other location in which the wood trim might interfere with the switch box, it is quite feasible to mount the switch box closely adjacent to a wall stud, as shown in Figure 2. Under other conditions, however, it is essential to space the switch box away from the nearest wall stud or other supporting device in order to provide room for the wood trim. The present invention provides a means whereby the switch box may be mounted close to a wall stud, thereby securing the greatest possible rigidity, or may be mounted at a greater distance from the wall stud or other supporting means, while retaining the advantage that the switch box may be disposed as near to the stud as the wood trim will permit.

Figures 3 and 4 represent conditions in which different sizes of wood trim are used. Referring to Figure 3, the wall stud 12 defines a doorway having a piece of trim 13 disposed in front of the stud 12. The numeral 14 indicates a piece of trim arranged laterally of the stud 12 and spaced a short distance therefrom, as for example by the block 15. The block 15 provides a recess, indicated by the numeral 16, in which the outer extremities of the ears 2—2 are disposed. The piece of trim 13 is held in spaced relationship with the wall stud 12 by lath (not shown) or other spacing means. According to the disclosure in Figure 3, the prong 7 nearest to the struck out portion 6 is used as a gauge, the middle prong 7 being used as a temporary attaching means.

Referring now to Figure 4, it will be noted that the piece of trim, indicated by the numeral 17, in front of the wall stud 12 is of greater width than the piece of trim shown in Figure 3. In this instance the middle prong 7 is used as a gauge for locating the switch box relative to the wall stud 12 and the outside prong 7 is used as a temporary attaching means for securing the ears to the wall stud 12.

Referring now to Figures 5, 6 and 7, it will be noted that the extremity of the flange 4 of each ear is bent over in the same direction as the prong 7—7. Said end of the flange 4, which end is indicated by the numeral 18, is pointed, whereby it may serve as a prong, thereby serving the same functions as the left-hand prong 7 shown in Figure 4. Said turned over end portion 18 is of larger size than the prongs 7—7, however, and is provided with a nail or screw hole 19, whereby the switch box 1 may be readily supported in a position adjacent to the floor independently of the wall studs, the ears being secured to the horizontal timbers of the building.

In service, the electrician can arrange the switch box in a great variety of positions, in the wall using box supporting ears of only one size. In cases where it is possible to locate the switch box adjacent to a wall stud, the members 6 of the two ears 2—2 will be disposed against a wall stud and the adjacent prong 7 will be pressed into the material of the stud, whereupon the prongs 7 will hold the ears temporarily in position, allowing the electrician to conveniently insert nails or screws through the holes 8—8 and 9—9. In instances where it is essential that the switch box be spaced from the stud, as for example when the distance from the stud is determined by trim, the electrician may use one or another of the prongs 7 as a gauge, as shown in Figures 3 and 4, using the next adjacent prong 7 as a temporary securing means which is effective to hold the switch box in position until the electrician secures the ears by means of nails or screws. The modification shown in Figures 5, 6 and 7 presents the advantage that the switch box may be readily supported either from the vertical studs or from the horizontal timbers. The present invention presents the advantage that the electrician need stock only one size of box supporting ear to accommodate a great variety of jobs.

Many modifications will occur to those skilled in the art. It is intended to cover all such modifications that fall within the scope of the appended claims.

What is claimed is—

1. In combination, a switch box and a pair of elongated ears, each comprising an integral member having two flanges in right-angular relationship with one another, said two flanges extending throughout substantially the whole length of said ear, one of said flanges comprising a box attaching portion, the other of said flanges having a portion struck therefrom and extending in a direction opposite to said one flange, said struck out portion being adapted to operate as a gauge against a wall stud, said other flange being provided with prongs struck therefrom in the same direction as said struck out portion, certain of said prongs being adapted to operate either as a securing means or as a gauge in connection with said wall stud.

2. In combination, a switch box, and a pair of elongated ears, each comprising an integral member having two flanges in right-angular relationship with one another, said two flanges extending substantially throughout the whole length of said ear, one of said flanges being formed adjacent to one end of said ear for attachment to said switch box, the other of said flanges including a plurality of struck out portions spaced from one another longitudinally of said ear, certain of said struck out portions being pointed whereby to serve either as prongs or gauges.

3. In combination, a switch box and a pair of elongated ears, each comprising an integral member having two flanges in right-angular relationship with one another, said two flanges extending substantially throughout the whole length of said ear, one of said flanges being formed adjacent to one end of said ear for attachment to said switch box, the other of said flanges including a plurality of struck out portions spaced from one another longitudinally of said ear, the struck out portions being located adjacent to the end of said ear opposite to said first mentioned end, the struck out portion closest to said first mentioned end being adapted to operate as a gauge in combination with a wall stud and a plurality of the remainder of said struck out portions being pointed whereby to operate either as gauges or temporary securing means.

4. Means for supporting a switch box from a wall stud at selectable distances therefrom whereby to combine a maximum of rigidity with the advantages of clearing wood trim located adjacent thereto comprising a box supporting ear formed of an integral member having two flanges in right angular relationship with one another, said two flanges extending throughout substantially the whole length of said ear, one of said flanges including a box attaching portion, the other of said flanges having a portion struck therefrom and extending in a direction opposite to said one flange, said struck out portion being adapted to operate as a gauge against a wall stud, said other flange being provided with a plurality of prongs struck therefrom in the same direction as said struck out portion, said prongs being adapted to operate either as securing means or as gauges in connection with said wall stud, said struck out portion and said prongs being spaced longitudinally of said ear.

5. A box supporting ear comprising an integral member having two flanges disposed in right angular relationship with one another throughout substantially the length of said ear, one of said flanges being formed for attachment to a switch box, the other of said flanges having a plurality of struck out portions spaced along said length of said ear, one of said struck out portions comprising a foot at an extremity of said ear and being provided with an aperture for the reception of a securing means.

Signed at New York, New York, by CHARLES NEWMAN, the 23rd day of August, 1927, and at Chicago, Illinois, by ERNST G. APPLETON, the 7th day of September, 1927.

CHARLES NEWMAN.
ERNST G. APPLETON.